United States Patent [19]

Aminpour et al.

[11] Patent Number: 5,797,109
[45] Date of Patent: Aug. 18, 1998

[54] METHOD FOR DETERMINING THE GRADIENT OF A ROADWAY

[75] Inventors: Ali Aminpour, Waiblingen; Michael Reiner, Fellbach, both of Germany

[73] Assignee: Mercedes-Benz AG, Stuttgart, Germany

[21] Appl. No.: 568,447

[22] Filed: Dec. 7, 1995

[30] Foreign Application Priority Data

Dec. 7, 1994 [DE] Germany .................. 44 43 522.3

[51] Int. Cl.$^6$ ............................................. G01C 9/06
[52] U.S. Cl. ............................................. 701/65; 701/80
[58] Field of Search ............ 364/423.098, 424.045, 364/424.094, 426.01, 426.025, 426.042, 559; 73/146; 33/521; 701/1, 36, 65, 70, 80, 94

[56] References Cited

U.S. PATENT DOCUMENTS

| | | | |
|---|---|---|---|
| 4,352,405 | 10/1982 | Marandet | 180/282 |
| 5,132,906 | 7/1992 | Sol et al. | 364/426.025 |
| 5,187,977 | 2/1993 | Koschorek et al. | 73/146 |
| 5,333,944 | 8/1994 | Shirai et al. | 364/426.01 X |
| 5,446,658 | 8/1995 | Pastor et al. | 364/423.098 |
| 5,612,686 | 3/1997 | Takano et al. | 340/903 |

FOREIGN PATENT DOCUMENTS

43 08 128   6/1994   Germany.

*Primary Examiner*—Tan Q. Nguyen
*Assistant Examiner*—Edward Pipala
*Attorney, Agent, or Firm*—Evenson, McKeown Edwards & Lenahan, P.L.L.C.

[57] ABSTRACT

The gradient of a roadway in the direction of travel of the vehicle is identified from signals present in the vehicle without any additional sensor systems. A freely rolling state of the at least one driven axle of the vehicle is detected at least once. In this state, the wheels of the driven axle also roll free of slip. In order to balance out the wheel speeds between the driven axles and the non-driven axles, the difference speed between the wheel speed of a driven axle and the wheel speed of a non-driven axle is identified. At the same time, the value of the braking, that is to say the value of the deceleration of the vehicle, is measured. The value of a gradient constant is identified from the identified values of the difference speeds and the braking operations. The gradient of the roadway can be determined with the gradient constant from the values of the difference speed and the values of the braking then identified. The gradient information can then be used to control the vehicle.

22 Claims, 4 Drawing Sheets

METHOD FOR DETERMINING THE GRADIENT OF A ROADWAY

BACKGROUND AND SUMMARY OF THE INVENTION

The invention relates to a method for determining the gradient of a roadway and, more particularly, to acquiring from measured signals in an evaluation unit of a motor vehicle, particularly a utility vehicle, a signal which represents the gradient of the roadway.

A known method for determining the gradient of a roadway is described in U.S. Pat. No. 4,352,405. According to U.S. Pat. No. 4,352,405, a roadway gradient is detected using a gradient sensor and is evaluated in an evaluation unit. The detection of the gradient of the roadway in the direction of travel is used here to select the operating position of a retarder system of the vehicle such that the downgrade forces are compensated by a corresponding braking torque of the retarder system.

This known device requires a complex sensor system in order to determine the angle of gradient of the roadway in the direction of travel. In addition, this sensor system is subject to the ongoing fluctuations of the vehicle body and the shaking of the vehicle, as a result of which the measuring accuracy is adversely affected. Apart from in vehicles with pneumatic suspension, a gradient sensor system does not take into account the inclination changes of the vehicle body with respect to the roadway as a result of different loadings of the vehicle.

The object of the present invention is to identify, without additional sensor systems, the gradient of the roadway in the direction of travel of the vehicle from signals detected in the vehicle for other purposes.

This object is achieved according to the present invention by a method for determining the gradient of a roadway wherein the wheel speeds of at least one non-driven axle and at least one driven axle are detected. A freely rolling state of the at least one driven axle of the vehicle is detected at least once. In this state, the wheels of the driven axle also roll slip-free. In order to balance out the wheel speeds between the driven axles and the non-driven axles, the difference speed between the wheel speed of a driven axle and the wheel speed of a non-driven axle is identified. At the same time, the value of the braking, that is to say the value of the deceleration of the vehicle, is identified. A drive state of the driven axle which has been detected as steady is then detected at least once within a prescribed time interval with respect to the freely rolling state of the driven axle. The difference speed between the driven axle and the non-driven axle and the braking of the vehicle is identified. The value of the braking is normally negative here, that is to say the vehicle is accelerated.

The difference between the difference speeds which have been identified during these two travel states is a measure of the drive force. The specific time interval between the detection in the case of a freely rolling state of the driving wheels and the steady-state operation of the driving wheels ensures that the gradient of the roadway has not changed substantially.

The value of a gradient constant is identified from the values of the difference speeds and of the braking which have been identified. As soon as a steady state of the driven axle is detected, the gradient constant can be used to determine the gradient of the roadway from the values of the difference speed and of the braking which are then identified.

The state of freely rolling driving wheels usually occurs when a gear change takes place, and the clutch is activated for this purpose. The power flux between the engine and driven axle is then interrupted. Since the "changing-up pauses", i.e., the gear changes in which a higher gear is engaged, are particularly suitable for evaluation, the state of freely rolling driving wheels is also designated below as "changing-up pauses". Most changing-up pauses are followed by an acceleration phase so that a steady drive state often occurs directly after a changing-up pause.

According to preferred embodiments of the invention, braking is identified from the change in the wheel speeds over time. According to this preferred embodiment, the detection of the wheel speeds is sufficient as the only measurement variable for carrying out the invention.

In further preferred embodiments of the invention, it is explained how a state of freely rolling driving wheels or a steady drive state of a driven axle can be detected from the wheel speeds which have been detected or from variables which can be identified from the wheel speeds.

According to a further embodiment, initially one value for the gradient constant is identified for each journey or vehicle trip before the gradient of the roadway can be identified.

According to one further embodiment of the invention, a new value for the gradient constant is identified at every occasion where it is possible to determine the gradient constant. The mean value formed from the values of the gradient constant identified during a journey is used as the gradient constant.

According to another preferred embodiment of the invention, a base pressure value is identified on the basis of the last value identified for the gradient of the roadway if a prescribed hold time between the time when the value for the gradient is identified and the activation is not exceeded. The base pressure value, which if necessary can also have a negative value, is at least then added to the desired brake pressure value resulting from the position of the brake pedal if the gradient represents a downgrade of the roadway.

Other objects, advantages and novel features of the present invention will become apparent from the following detailed description of the invention when considered in conjunction with the accompanying drawings.

DETAILED DESCRIPTION OF THE DRAWINGS

Figure 1A:
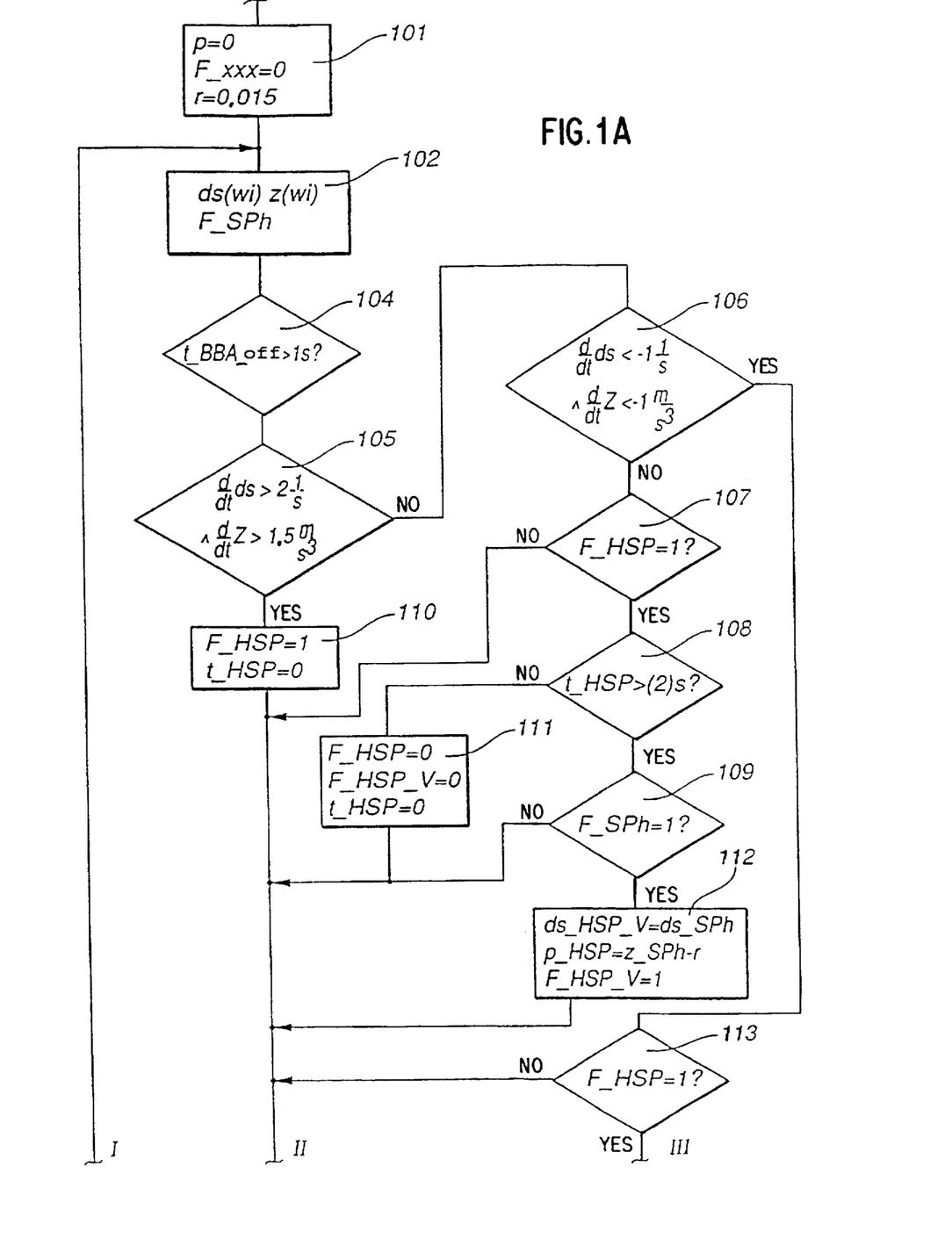
FIGS. 1A and 1B illustrate a flow diagram of a method according to the present invention.
Figure 1B:
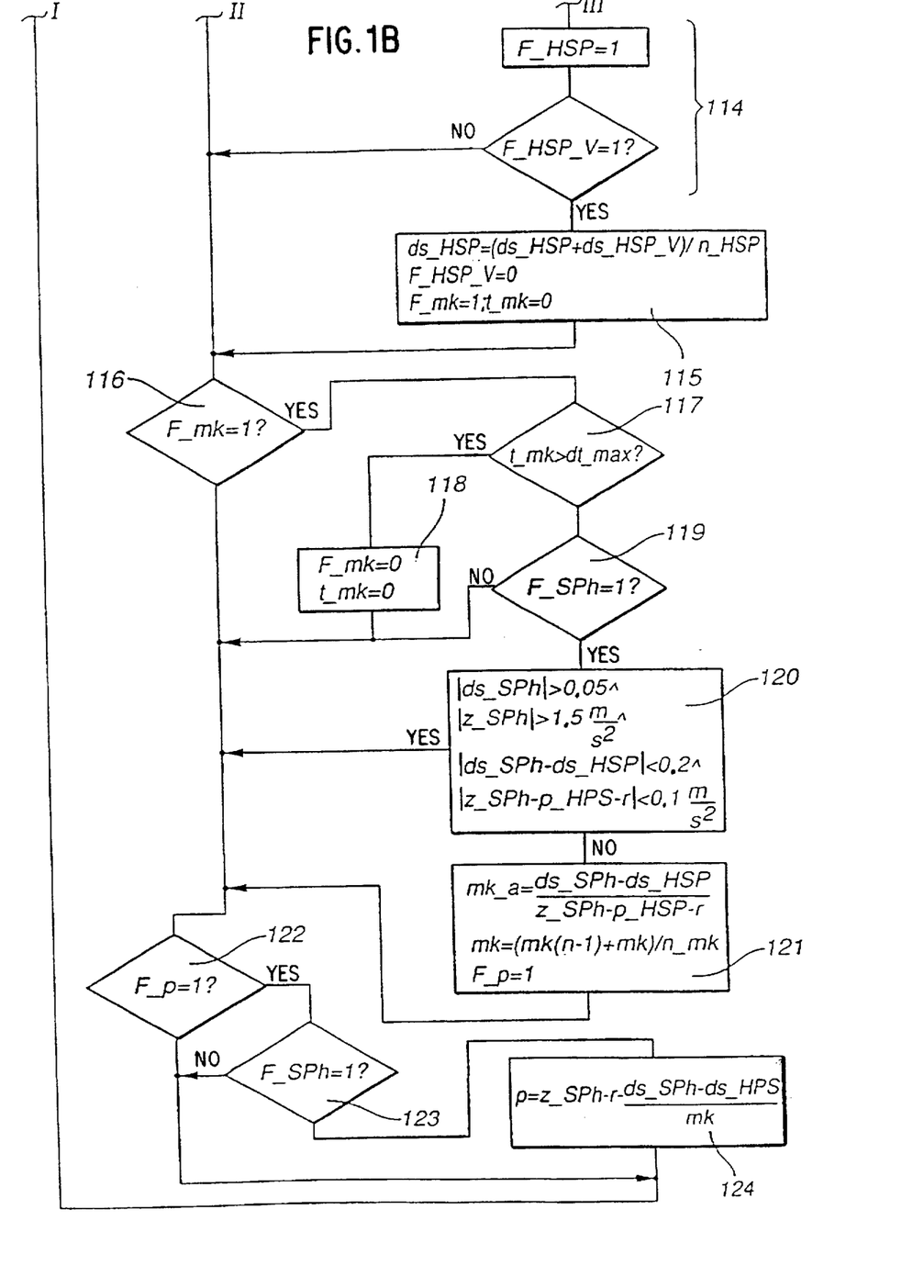

FIGS. 1A and 1B illustrate a flow diagram of a method according to the invention. The method is performed cyclically.

The following designations are used in the figures and throughout the specification: the abbreviation HSP stands for changing-up pause and generally designates a freely rolling state of the driven axle; the abbreviation SPh stands for steady-state phase and designates steady-state phases detected during a changing-up pause or during a drive state; the value of the variable which has been measured or determined in the corresponding state is designated in conjunction with the designation of a variable; the diverse pointers which are set in order to detect instances of branching-off are designated by "F__" and the variable appended to it as a characterization of the pointer; and various time intervals are measured which are designated by "t__" and a characterization, appended thereto, of the significance of the time interval.

The method which will be described below with respect to FIGS. 1A and 1B can be performed on an appropriately programmed processor functioning as an electronic control unit (ECU) or evaluation unit in the vehicle, such as a Mercedes-Benz anti-lock braking controller, Model No. DB-NR.0004462514. The implementation of the programming details is well within the purview of one skilled in the art based on the present specification and drawing figures. Alternatively, a hard wired circuit implementation can be used in lieu of the programmed processor.

An initialization of the method is carried out in step 101. The values of all the pointers F__ are reset to zero. The value of the gradient of the roadway in the direction of travel P is reset to zero. The value from a memory in the evaluation unit or processor is read-in for the vehicle deceleration r based on travel resistances. This value can either be prescribed as a fixed value or else can be selected as a function of vehicle parameters and variables which represent the travel state. Thus, the coefficient of air resistance of the vehicle is known and its speed can be derived, for example, from the wheel speeds. Because of this, the portion of the travel resistances which is air resistance can be at least approximately determined. The same applies to the influences of the rotating masses. It can also be determined experimentally on a calibration path with a known gradient of the roadway, for example, a plane. This initialization takes place at the start of each journey or trip since significant vehicle factors, for example the load, can change.

In step 102, unacceptable travel states are filtered out. Vehicle cornering is detected from the wheel speed signals, for example on the basis of a comparison of the wheel speeds on part of the vehicle, and is excluded from the rest of the method. It is also checked whether the values of the difference speed ds and of the braking z identified in this cycle can be assigned to a steady state. In this case, the pointer F__SPh is set to "1". Otherwise, it is set to "0".

The activation of the brake can also be evaluated as an unacceptable travel state. This is necessary when the braking torques resulting from the activation of the brake, and thus the braking torques resulting therefrom, cannot be sufficiently identified in a precise manner. If, however, the deceleration resulting from the activation of the brake is known with sufficient precision, the method can also be carried out if the brake is activated.

In step 104, the method checks whether the time which has passed after the end of the last activation of the brakes is longer than one second. This is used to exclude signals influenced by braking processes.

In steps 105 to 115, the changing-up pauses and the steady states are identified and the corresponding values of the required variable are determined. In steps 116 to 121, the value of the gradient constant mk is identified from the corresponding values by averaging previously identified values of the gradient constant. The steps 122 to 124 are used to identify the gradient of the roadway as soon as a value for the gradient constant is present.

Figure 2:
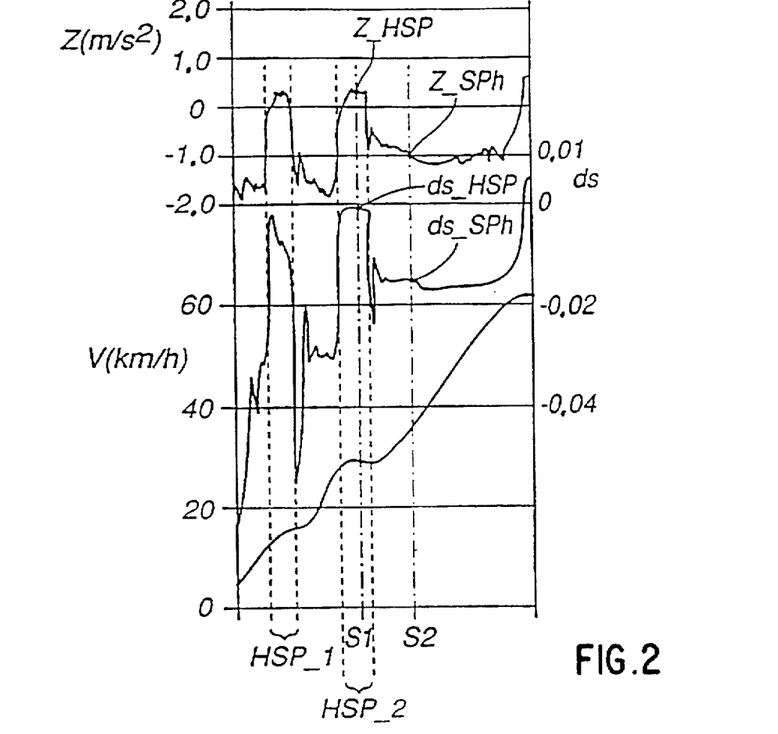
FIG. 2 is a graphical example of the profiles, entered against time, of variables derived from the wheel speeds.

In step 105, the method checks here whether a rapid rise in the difference speed ds and, at the same time, a rapid rise in the braking dz takes place. The time derivatives of these two variables must therefore be identified numerically. For this purpose, for example, the difference between the present value of the difference speed ds and the value of the difference speed ds' during the preceding identification is calculated, and the quotient of the difference with the time which has passed between the two identifications of the difference speed is formed. An analogous procedure can be adopted for the braking z. The values obtained are compared with prescribed upper threshold values. For the time derivation of the difference speed—which according to that described for FIG. 2 is present in the form of a dimensionless variable whose time derivative is thus present in the unit 1/s—the threshold value is for example $0.02 \times 1/s$.

The threshold value for the time derivative of the braking has the unit $m/s^3$ and, for example, a value of 1.5 $m/s^3$. It is to be noted here that both the braking and the differential speed variables are accompanied by a relevant sign and, therefore, the reduction in the absolute value of a value with a negative sign is also referred to as a rise.

If the upper threshold values both for the rise in the difference speed and for the rise in the braking are exceeded, the possible start of a changing-up pause is inferred. According to step 110, the pointer F__HSP, which characterizes a changing-up pause, is then set, that is to say it as assumes the value "1". The time counter t__HSP for the duration of the changing-up pause or the freely rolling state of the drive axle is also reset to "0". Subsequently, the system jumps to step 116.

If it is detected in step 105 that the threshold values have not been exceeded, in step 106 the method checks whether a rapid decrease (a steep drop) is present in the braking and the difference speed. For this purpose, it is checked whether the time derivative of the difference speed ds and the time derivative of the braking z drop below prescribed lower threshold values. Here, it is to be noted that because of the sign, a rapid decrease corresponds to an increase in the variables in terms of absolute value if the lower threshold values have a negative sign. The lower threshold value for the time derivative of the difference speed ds is for example $-0.01$ 1/s and the lower threshold value for the braking z is for example $-1$ $m/s^3$.

If the values drop below the two lower threshold values, a possible end of a changing-up pause is inferred and the system jumps to step 113. In step 113, the method checks whether the start of a changing-up pause has been previously detected in that it is checked whether the pointer F__HSP has the value 1. The steep drop in the braking z and the difference speed ds can only constitute the end of a changing-up pause if a start of a changing-up pause has been detected before the end. If the pointer F__HSP does not have the value "1", the system jumps to step 116. Otherwise, an acceptable changing-up pause is actually present and, in step 115, the calculation of the difference speed ds__HSP is identified for the freely rolling state of the driven axle. This takes place by averaging using the buffered value of the difference speed ds__HSP__V, for example, according to the equation:

$$ds\_HSP=(ds\_HSP*(n\_HSP-1)+ds\_HSP)/n\_HSP,$$

n HSP being the number of acceptable changing-up pauses which have been identified during the present journey and is also incremented in this step before the calculation. The pointer F__HSP__V is reset to "0". The pointer F__mk for the identification of the gradient constant mk is set to "1" and the time counter t_k is reset to "0". Subsequently, the system jumps to step 116.

The speed difference ds_HSP identified in this way is a measure of the differences in speed between the non-driven axle and the driven axle. It can be used as a basis for balancing out speeds, for example for determining tire pressures or for an anti-lock brake system. It is continuously updated and, since it only comprises measurement values detected during freely rolling states, it is a very good measure of the speed difference owing to different tire circumferences.

If it is detected in step 106 that a steep drop in the braking z and the difference speed ds has not occurred, in steps 107 to 109 and 111 to 112 a plausibility check is begun. For this, it is checked in step 107 whether the pointer F_HSP has been set to "1" in a preceding cycle, that is to say whether the start of a changing-up pause has been identified. If this is not the case, the system jumps to step 116. Otherwise, it is checked in step 108 whether the time counter t_HSP for the duration of the changing-up pause since the setting of the pointer F_HSP has exceeded a limit value of, for example, 2s. If this is the case, in step 111 the pointers F_HSP and F_HSP_V and the time counter t_HSP are reset to "0" since it is not plausible for a changing-up pause or a freely rolling state of the wheels to last so long. After the step 111, the system jumps to step 116.

In contrast, if it is detected in step 108 that the time counter t_HSP has not exceeded the time limit, it is checked in step 109 whether a steady state is present, that is to say whether the pointer F_SPh is set to "1". If this is not the case, the system jumps to step 116. Otherwise, in step 110 the pointer F_HSP_V is set to "1", and the value of the difference speed ds_SPh detected as in a steady-state is read-in as the value for the buffered difference speed ds_HSP_V. The value for the braking p_HSP due to the gradient is identified from the braking z_SPh detected as in a steady-state, according to the equation:

$$p\_HSP = z\_SPh - r,$$

r being the deceleration resulting from the travel resistances and z_SPh being the braking associated with the steady state. Here, the braking z_SPh and the difference speed ds_SPh were identified in step 102 for the same time. Subsequently, the system jumps to step 116.

In step 116, the method checks whether the pointer F_mk for the calculation of the gradient constant is set to "1". If this is not the case, the system jumps to step 122. Otherwise, it is checked in step 117 whether the time counter t_mk has not yet exceeded the prescribed time interval dt_max, for example 7 s. Instead of a fixed time threshold, prescribed values can also be given as a travel threshold or as a function of speed. Thus, the prescribed time interval dt_max can be calculated for example according to the equation:

$$dt\_max = (100/v) + 2s$$

v being the speed in km/h. This corresponds to a speed dependent time or travel threshold of approximately 50 m at a speed of 50 km/h. The maximum time interval dt_max is decreased as the speed v increases so that the assumption on which the method is based—that the gradient p of the roadway in the direction of travel remains at least approximately constant—is valid. If it is detected in step 117 that the maximum time interval dt_max has been exceeded, the value measured during the preceding changing-up pause cannot continue to be used to determine the gradient constant. In step 118, the pointer F_mk and the time counter t_mk are therefore reset to "0" and the system jumps to step 122.

In contrast, if it is detected in step 117 that the maximum time interval dt_max has not yet been exceeded, the gradient constant mk can be determined if a steady state is present. For this purpose, it is checked in step 119 whether the pointer F_SPh is set to "1". If this is not the case, there is presently no steady state and the system jumps to step 122. Otherwise, in step 120 the measured values of the steady state are checked in order to exclude values which are unacceptable or which impair the measuring accuracy. The cases of excessively low drive forces and the cases of excessively strong braking z or excessively large difference speed ds_SPh are excluded. The last two criteria serve to exclude states in which the hypothesis of linear characteristic tire curves can no longer be acceptably used. It is therefore checked whether either: the absolute value of the braking z_SPh of the steady state is greater than, for example $$1.5 \text{ m/s}^2;$$

or whether the absolute value of the difference speed ds_SPh is greater than, for example 0.05;

or whether the absolute value of the difference between the difference speed ds_SPh of the drive state which is detected as steady and the difference speed ds_HSP of the freely rolling state of the drive axle is smaller than, for example 0.02;

or whether the absolute value of the difference between the braking z_SPh and the braking z_HSP is smaller than, for example 0.1 m/s².

If this is the case, the drive state detected as steady cannot be used to determine the gradient constant and the system jumps to step 122.

Otherwise, in step 121 a new value for the gradient constant mk is calculated by averaging the values of the gradient constant mk possibly already identified during the present journey. Firstly, the value of the gradient constant mk_a is identified from the present values of the braking z and the difference speed ds according to the equation:

$$mk\_a = |ds\_SPh - ds\_HSP|/|z\_SPh - z\_HSP|.$$

The values of the braking are then restricted to an interval of, for example, 0.005 to 0.12 for reasons of plausibility. Subsequently, the averaging according to the equation:

$$mk = |mk \times (n\_mk - 1) + mk\_a|/n\_mk,$$

takes place, n_mk being a counter for the number of identifications of the gradient constant during the journey, which counter has been previously incremented. The pointer F_p is set to "1", that is to say the identification of the gradient p of the roadway in the direction of travel is made possible. The step 122 follows.

In step 122 it is checked whether the pointer F_p is set to "1", that is to say whether a gradient constant mk has been identified at least once during the present journey. Only then is it possible to correctly determine the gradient of the roadway in the direction of travel. If this is not the case, the system jumps to step 102 and a new working cycle begins. Otherwise, it is checked in step 123 whether a steady state of the difference speed ds and the braking z has been detected. If this is not the case, the system jumps back to step 122. Otherwise, the determination of the gradient p takes place in step 124 according to the equation:

$$p = \frac{z\_SPh\text{-}r - ds\_SPh\text{-}ds\_HSP}{g \qquad mk}$$

g being the acceleration due to gravity. The gradient p is a dimensionless variable and corresponds to the tangent of the angle of gradient of the roadway. A negative gradient corresponds to a downgrade and a positive gradient corresponds to an upgrade of the roadway. Subsequently, the system jumps to step 102 and a new cycle begins. The gradient value identified last can be used for example to identify a base pressure value which has a negative sign in the case of an upgrade and which is added to the desired pressure value prescribed by the position of the accelerator pedal. As a result, the applied braking pressure is adapted better to a desired deceleration prescribed by the position of the brake pedal. As soon as the gradient constant mk has been determined once, a present value of the gradient p of the roadway can be successively identified during the journey after each steady-state phase is detected. In travel mode, the steady-state phases occur at time intervals of approximately 0.5 up to several seconds. Usually, a steady-state phase is detected for the last time when the driver changes his foot from the accelerator pedal to the brake pedal, that is to say directly before the activation of the brakes. A present value for the gradient of the roadway is therefore continuously available.

FIG. 2 shows the profile of the three curves: the vehicle velocity in km/h, difference speed ds (dimensionless) and braking in m/s$^2$ for a starting-up process from the stationary state on a level surface against time t. The curve illustrated at the top represents the profile of the braking z, the curve in the center is for the difference speed ds and the curve at the bottom is for the vehicle velocity v.

All three variables: braking, difference speed and the vehicle velocity can be derived from the wheel speeds. Here, the difference speed is defined as a dimensionless variable so that it is independent of the vehicle velocity. In order to determine the difference speed, the wheel speed ω for a driven axle, for example the wheel speed ω_HA of the rear axle is identified and the wheel speed ω for a non-driven axle, for example the wheel speed ω_VA of the front axle is identified. The difference speed is then defined as a quotient of the difference in speed with respect to the speed of the nondriven axle, that is to say it is calculated according to the equation:

$$ds = [\omega\_VA - \omega\_HA]/\omega\_VA.$$

Two changing-up pauses can be detected in the curves illustrated. Here, owing to the strongly fluctuating values of the speed difference ds, the first changing-up pause cannot be used to determine the gradient constant. The start of the changing-up pauses can be detected easily by means of the steep rise A1 or A2 in the braking z. The end of the changing-up pauses HSP_1 and HSP_2 can likewise be detected from the steep drop Ab1 and Ab2. A freely rolling state of the drive axle during which the difference speed ds and the braking z have a steady-state phase is detected at the time S1 during the changing-up pause HSP_2 so that these values are used as the difference speed ds_HSP and the braking z_HSP for calculating the gradient constant mk.

In the further course of the procedure, at time S2, a steady drive state with the difference speed ds_SPH and the braking z_SPh is identified.

Figure 4:
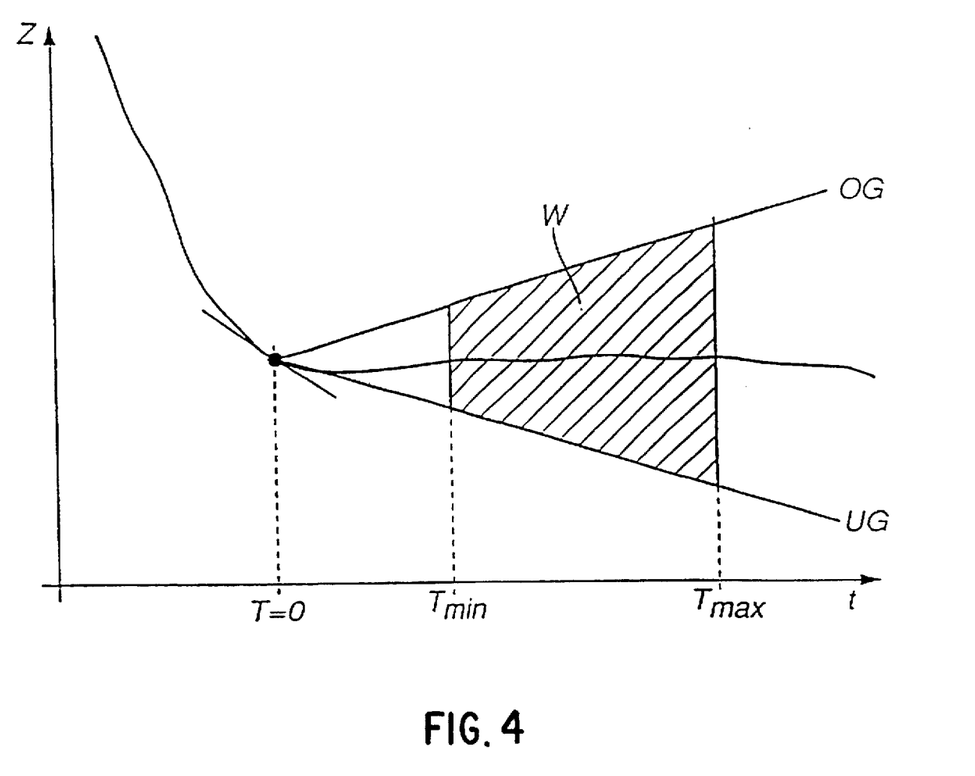
FIG. 4 is a graph illustrating the identification of a steady state with reference to an example of the braking operation.

Below, there is a description, with reference to the braking z, of how, during the variation over time, the value of a variable is evaluated as being associated with a steady state, and this is illustrated in FIG. 4. If the absolute value of the time derivative of the braking z drops below a prescribed threshold value—for example 1 m/s$^3$—a time counter is started. After a minimum time Tmin after the start time T=0, for example Tmin=0.2 s, whether the braking z leaves a value interval W is monitored up to a maximum time Tmax, for example, Tmax=1 s. The upper limit OG and lower limit UG of the value interval W are defined by two straight lines which intersect at the point at which the absolute value of the time derivative drops below the threshold value. The positive gradient of the straight lines is, for example, 0.5 m/s$^3$ here.

Figure 3:
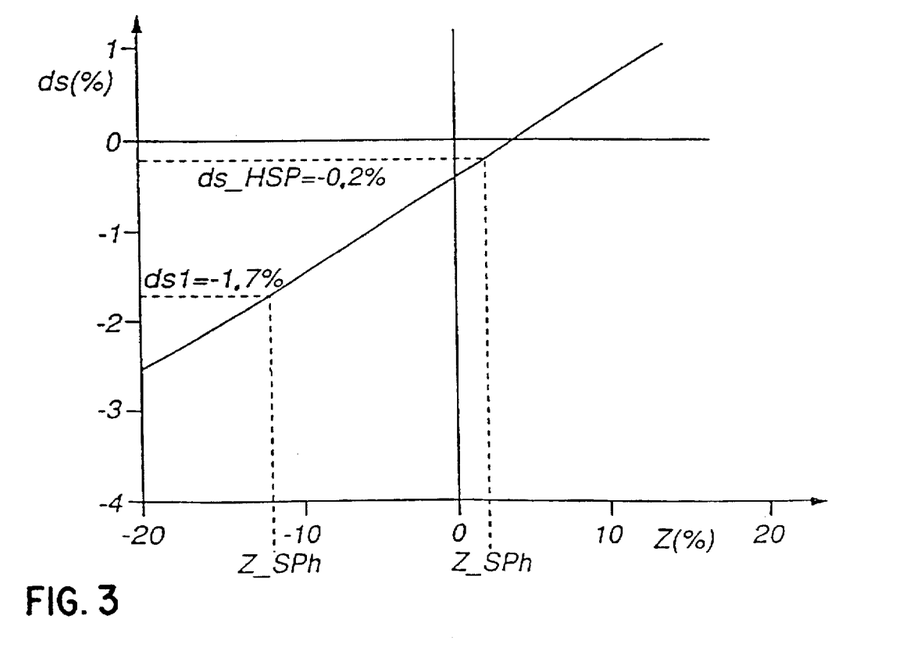
FIG. 3 is a graphical example of the identification of the gradient constant from one pair of values for braking and the difference speed identified for, in each case, a freely rolling state of the driven axle and a steady drive state.

It is illustrated in FIG. 3 how the gradient constant results from the measurement values acquired during the changing-up pause HSP_2 and the steady state S2. The braking z is entered as the abscissa and the difference speed ds is entered as the ordinate. The gradient constant corresponds to the positive gradient of the straight line which connects the points measured at the times S1 and S2 to the coordinates (z_HSP, ds_HSP) and/or (z_SPh, ds_SPh).

In accordance with the present invention, the determination of the gradient of the roadway can be used to operate and control the motor vehicle in a safer and more efficient manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for determining a gradient of a roadway upon which a vehicle is travelling in a travelling direction from measured signals fed to an evaluation unit, the method comprising the steps of:

detecting and feeding wheel speeds of at least one non-driven axle and at least one driven axle of the vehicle to the evaluation unit;

detecting a freely rolling state of the at least one driven axle in the evaluation unit;

identifying in the evaluation unit, when the freely rolling state is detected, a value of a speed difference ds_HSP between the wheel speed of said one driven axle and the wheel speed of said one non-driven axle, and a value of a braking operation;

detecting in the evaluation unit a drive state of a driven axle which is steady and is at a prescribed time interval from said freely rolling state of said at least one driven axle;

identifying in the evaluation unit, when the drive state is detected, a second value of the braking operation z_SPh and a second value of the speed difference ds_SPh between the wheel speed at said driven axle and said non-driven axle;

determining in the evaluation unit a gradient constant mk from said identified values ds_HSP, ds_SPh, z_HSP, z_SPh;

determining in the evaluation unit a gradient p of the roadway in the travelling direction when there are successive states of said driven axle which have been detected as steady, said gradient of the roadway in the travelling direction being determined from said gradient constant mk and present values of the braking operation z_SPh and the speed difference ds_SPh between the wheel speed at said driven axle and said non-driven axle; and using said gradient of the roadway determined in the evaluation unit to control the vehicle.

2. The method according to claim 1, wherein the values of the braking operation (z) are identified from a time-dependent change in the wheel speeds of at least said non-driven axle.

3. The method according to claim 1, wherein said step of detecting said freely rolling state of the at least one driven axle further comprises the steps of:

checking whether said freely rolling state is steady;

identifying said values of the speed difference ds_HSP and the braking operation z_HSP only if the steady state is detected during the freely rolling state.

4. The method according to claim 3, wherein said values of the speed difference ds_HSP and the braking operation z_HSP are determined from values of the wheel speeds detected during the said steady state.

5. The method according to claim 4, wherein said values of the speed difference ds_HSP and the braking operation z_HSP identified during a preceding steady state of the freely rolling state are used to determine the gradient constant.

6. The method according to claim 1, wherein the step of detecting the freely rolling state of the at least one driven axle further comprises the step of:

determining a start of said freely rolling state when a steep rise occurs in the speed difference between the wheel speeds of the driven axle and the non-driven axle for a brief time and, simultaneously, a steep rise occurs in a deceleration.

7. The method according to claim 6, further comprising the step of:

detecting an end of the freely rolling state of the at least one driven axle when, for a brief time, a steep drop occurs in the speed difference between the driven axle and the non-driven axle and, simultaneously, a steep drop occurs in the deceleration.

8. The method according to claim 7, further comprising the step of:

terminating said freely rolling state at a latest after a prescribed time interval expires from the start of the freely rolling state.

9. The method according to claim 6, further comprising the step of:

terminating said freely rolling state at a latest after a prescribed time interval expires from the start of the freely rolling state.

10. The method according to claim 8, wherein the values of the speed difference ds_HSP and the braking operation z_HSP determined during the freely rolling state are not used to calculate the gradient constant mk if the freely rolling state has been terminated as a result of the prescribed time interval expiring.

11. The method according to claim 1, wherein the steady state is detected if an observed variable does not leave a value interval within a time window between a start time and an end time, said value interval being prescribed as a function of time for the observed variable, and wherein the time window starts after a minimum time has elapsed after the start time, and wherein the time window ends at a latest after a maximum time, said start time being determined by an absolute value of a time derivative of the observed variable dropping below a prescribed value.

12. The method according to claim 11, wherein said observed variable is one of the deceleration and a variable dependent on the deceleration.

13. The method according to claim 11, wherein said value interval is determined by a lower limit and an upper limit, both said lower limit and said upper limit being linearly dependent on time which has passed since the start time, and wherein a function value of the upper limit and the lower limit at the start time corresponds to a value of the observed variable at the start time.

14. The method according to claim 1, wherein said gradient constant is formed from a quotient between the difference between values of the speed difference ds_SPh, ds_HSP and the difference between values of the braking operation z_SPh, z_HSP.

15. The method according to claim 1, wherein a new value for the gradient constant mk is identified during a journey from all acceptable freely rolling states of the at least one driven axle with a subsequent drive state of a driven axle which is detected as steady, and wherein a mean value is calculated from values of the gradient constant mk identified during the journey.

16. The method according to claim 1, wherein an identification of the gradient p of the roadway in the travelling direction is not performed as long as a value for the gradient constant mk has not been identified at least once since the start of a journey.

17. The method according to claim 1, wherein the prescribed time interval is determined as a function of a velocity of the vehicle.

18. The method according to claim 17, wherein the prescribed time interval is prescribed as a maximum distance covered by the vehicle.

19. The method according to claim 1, further comprising the steps of identifying a base pressure value on the basis of the last value identified for the gradient p of the roadway, the base pressure value being at least then added to a desired braking pressure value resulting from a position of a brake pedal if the gradient p represents a downgrade of the roadway.

20. The method according to claim 1, wherein values of the wheel speeds of the wheels of the driven and non-driven axles which have been identified during a freely rolling state of the driven axle are used for balancing out the wheel speeds.

21. The method according to claim 1, wherein a mean value is formed from the values, identified during a journey, of the speed difference ds_HSP of a freely rolling state of the driving wheels.

22. A system for determining a gradient of a roadway upon which a vehicle is travelling in a travelling direction, the system comprising:

wheel speed sensors for detecting and outputting wheel speed signals for at least one non-driven axle and at least one driven axle of the vehicle;

a processor including a memory programmed so as to perform the following steps:

detecting a freely rolling state of the at least one driven axle;

identifying for the freely rolling state at least a value of a speed difference ds_HSP between the wheel speed of said one driven axle and the wheel speed of said one non-driven axle, and a value of a braking operation z_HSP;

detecting a drive state of a driven axle which is steady and is at a prescribed time interval from said freely rolling state of said at least one driven axle;

identifying for the drive state a second value of braking z_SPh and a second value of the speed difference ds_SPh between the wheel speed at said driven axle and said non-driven axle;

determining a gradient constant from said identified values ds_HSP, ds_SPh, z_HSP, z_SPh;

determining a gradient of the roadway in the travelling direction when there are successive states of said driven axle which have been detected as steady, said gradient of the roadway in the travelling direction being determined from said gradient constant and present values of the braking z_SPh and the speed difference ds_SPh between the wheel speed at said driven axle and said non-driven axle; and wherein the gradient of the roadway determined in the processor is used to control the vehicle.

* * * * *